United States Patent
Inoshita

(10) Patent No.: US 12,394,099 B2
(45) Date of Patent: *Aug. 19, 2025

(54) IMAGE CONVERSION BY USING COLOR DISTRIBUTION

(71) Applicant: NEC Corporation, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,656

(22) Filed: Jun. 11, 2024

(65) Prior Publication Data

US 2024/0331201 A1 Oct. 3, 2024

Related U.S. Application Data

(63) Continuation of application No. 17/440,407, filed as application No. PCT/JP2020/000728 on Jan. 10, 2020, now Pat. No. 12,039,758.

(30) Foreign Application Priority Data

Mar. 27, 2019 (JP) .................................. 2019-061866

(51) Int. Cl.
G06T 7/90 (2017.01)

(52) U.S. Cl.
CPC ...... G06T 7/90 (2017.01); *G06T 2207/20081* (2013.01)

(58) Field of Classification Search
CPC ............. G06T 7/90; G06T 2207/20081; G06F 18/214; G06V 10/776; G06V 10/993; G06V 10/56

See application file for complete search history.

(56) References Cited

U.S. PATENT DOCUMENTS

| 2014/0198951 A1 | 7/2014 | Aoba et al. |
| 2016/0098636 A1 | 4/2016 | Okonogi |

(Continued)

FOREIGN PATENT DOCUMENTS

| JP | H07-21367 A | 1/1995 |
| JP | 2014-137756 A | 7/2014 |

(Continued)

OTHER PUBLICATIONS

Park, Jongchan, Joon-Young Lee, Donggeun Yoo, and In So Kweon. "Distort-and-recover: Color enhancement using deep reinforcement learning." In Proceedings of the IEEE conference on computer vision and pattern recognition, pp. 5928-5936. 2018. (Year: 2018).*

(Continued)

*Primary Examiner* — Wassim Mahrouka

(57) ABSTRACT

The present disclosure provides an image processing apparatus capable of efficiently generating a learning model having a high accuracy. An image processing apparatus (1) includes a data acquisition unit (2), a data generation unit (4), a recognition accuracy calculation unit (6), and a learning data output unit (8). The data acquisition unit (2) acquires input image data. The data generation unit (4) converts the input image data by using a data conversion parameter and newly generates image data. The recognition accuracy calculation unit (6) calculates a recognition accuracy of the image data generated by the data generation unit (4) by using a learning model stored in advance. The learning data output unit (8) outputs, as learning data, the image data of which the recognition accuracy calculated by the recognition accuracy calculation unit (6) is lower than a first threshold.

15 Claims, 11 Drawing Sheets

(56) References Cited

U.S. PATENT DOCUMENTS

| | | |
|---|---|---|
| 2018/0365830 A1 | 12/2018 | Kitamura |
| 2019/0057285 A1 | 2/2019 | Hisada |
| 2019/0268500 A1* | 8/2019 | Ichikawa ................. H04N 1/46 |

FOREIGN PATENT DOCUMENTS

| | | |
|---|---|---|
| JP | 2016-76073 A | 5/2016 |
| JP | 2017-045441 A | 3/2017 |
| JP | 2018-169672 A | 11/2018 |
| WO | 2017/109904 A1 | 6/2017 |
| WO | 2017/145960 A1 | 8/2017 |

OTHER PUBLICATIONS

International Search Report for PCT Application No. PCT/JP2020/000728, mailed on Mar. 24, 2020.

* cited by examiner

IMAGE CONVERSION BY USING COLOR DISTRIBUTION

This application is a Continuation of U.S. application Ser. No. 17/440,407 filed on Sep. 17, 2021, which is a National Stage Entry of PCT/JP2020/000728 filed on Jan. 10, 2020, which claims priority from Japanese Patent Application 2019-061866 filed on Mar. 27, 2019, the contents of all of which are incorporated herein by reference, in their entirety.

TECHNICAL FIELD

The present disclosure relates to an image processing apparatus, an image processing method, and a non-transitory computer readable medium storing a program.

BACKGROUND ART

In machine learning using deep learning or the like, in order to create a learning model (a recognition dictionary) having a high recognition accuracy, a large amount of learning data (training data) and a large number of correct labels are required. However, it is difficult to collect various patterns (mainly, environmental changes such as spring, summer, autumn, and winter, or day and night) as learning data during a limited operation period.

In relation to the above technique, Patent Literature 1 discloses an image generation method capable of generating training images used for machine learning for image recognition by a simple method using images whose image capture conditions are unknown. The method disclosed in Patent Literature 1 includes obtaining an image of a first area included in a first image and an image of a second area included in a second image. Further, the method disclosed in Patent Literature 1 includes calculating a first conversion parameter for converting the image of the first area such that color information regarding the image of the first area becomes similar to color information of the image of the second area. The method disclosed in Patent Literature 1 includes converting the first image using the first conversion parameter and generating a third image by combining the converted first image and the second image with each other.

CITATION LIST

Patent Literature

Patent Literature 1: Japanese Unexamined Patent Application Publication No. 2017-45441

SUMMARY OF INVENTION

Technical Problem

In the technique disclosed in Patent Literature 1, a large number of training images are generated by generating a new third image using the first and the second images. On the other hand, it is difficult to generate a learning model having a high recognition accuracy only by generating a large number of training images.

The present disclosure has been made to solve the above-described problem and an object thereof is to provide an image processing apparatus, an image processing method, and a program that are capable of efficiently generating a learning model having a high accuracy.

Solution to Problem

An image processing apparatus according to the present disclosure includes: data acquisition means for acquiring input image data; data generation means for converting the input image data by using a data conversion parameter and newly generating image data; recognition accuracy calculation means for calculating a recognition accuracy of the image data generated by the data generation means by using a learning model stored in advance; and learning data output means for outputting, as learning data, the image data of which the recognition accuracy calculated by the recognition accuracy calculation means is lower than a predetermined first threshold.

Further, an image processing method according to the present disclosure includes: acquiring input image data; converting the input image data by using a data conversion parameter and newly generating image data; calculating a recognition accuracy of the generated image data by using a learning model stored in advance; and outputting, as learning data, the image data of which the calculated recognition accuracy is lower than a predetermined first threshold.

Further, a program according to the present disclosure causes a computer to: acquire input image data; convert the input image data by using a data conversion parameter and newly generate image data; calculate a recognition accuracy of the generated image data by using a learning model stored in advance; and output, as learning data, the image data of which the calculated recognition accuracy is lower than a predetermined first threshold.

Advantageous Effects of Invention

According to the present disclosure, it is possible to provide an image processing apparatus, an image processing method, and a program that are capable of efficiently generating a learning model having a high accuracy.

DESCRIPTION OF EMBODIMENTS

Overview of Example Embodiments According to Present Disclosure

Figure 1:
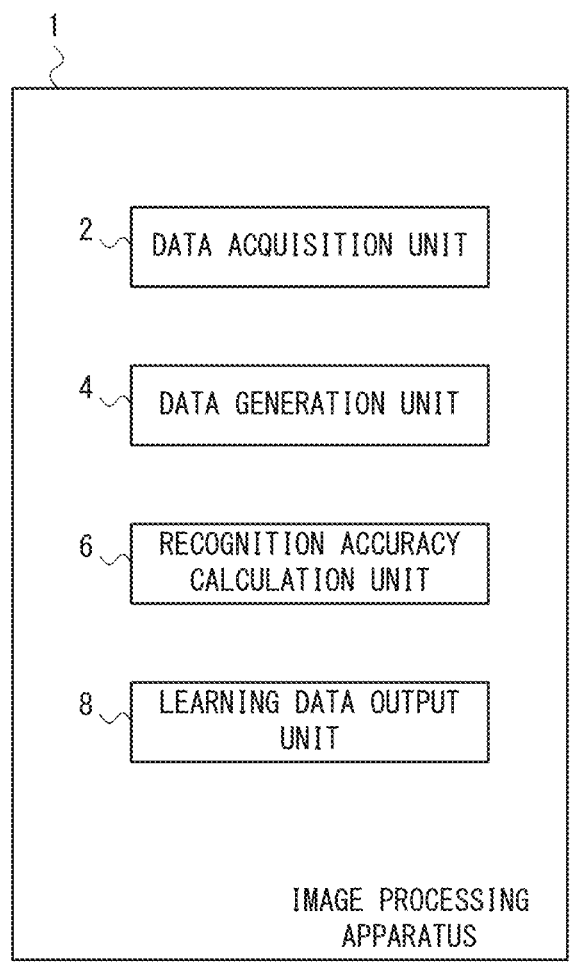
FIG. 1 is a diagram showing an overview of an image processing apparatus according to example embodiments of the present disclosure.

Prior to describing example embodiments according to the present disclosure in detail, an overview of the example embodiments will be given. FIG. 1 shows an overview of an image processing apparatus 1 according to the example embodiments of the present disclosure. The image processing apparatus 1 is, for example, a computer such as a server.

The image processing apparatus 1 includes a data acquisition unit 2, a data generation unit 4, a recognition accuracy calculation unit 6, and a learning data output unit 8. The data acquisition unit 2 functions as data acquisition means. The data generation unit 4 functions as data generation means. The recognition accuracy calculation unit 6 functions as recognition accuracy calculation means. The learning data output unit 8 functions as learning data output means.

The data acquisition unit 2 acquires input image data. The input image data is data indicating a captured input image. The data generation unit 4 converts input image data by using a data conversion parameter and newly generates image data. The recognition accuracy calculation unit 6 calculates a recognition accuracy of the image data generated by the data generation unit 4 by using a learning model stored in advance. The learning data output unit 8 outputs, as learning data, image data of which the recognition accuracy calculated by the recognition accuracy calculation unit 6 is lower than a predetermined first threshold. The output learning data is used to generate a learning model (update the learning model stored in advance).

The image processing apparatus 1 according to the present disclosure is configured as described above, so that it is possible to automatically acquire image data having a low recognition accuracy as learning data. Here, it is preferable that a large amount of learning data be used to generate a learning model by performing machine learning such as deep learning. However, it is difficult to generate a learning model having a high accuracy only by using a large amount of learning data. That is, in order to improve accuracy (a generalization performance) of a learning model, it is desirable that the learning data used when the learning model is generated be various types of image data. Specifically, in a case in which a learning model that recognizes a certain object is generated, and when there are few variations (seasons, weather, time, etc.) of the environment in which the object is captured, a learning model that cannot recognize the object captured under an environment deviating from the variations may be generated. For example, when an object A is recognized, a learning model is generated by using only an image of the object A captured on a sunny summer morning. In this case, the learning model may not be able to recognize the object A in the image of the object A captured on a rainy winter night.

The image data captured under the environment in which the recognition accuracy is low in a learning model to be generated is newly used as learning data in order to prevent or reduce occurrences of the above situation, whereby the recognition accuracy of the image under the environment in which the recognition accuracy is low may be improved. Thus, the accuracy (the generalization performance) of the learning model may be improved. Therefore, by acquiring image data having a low recognition accuracy as learning data by the image processing apparatus 1 according to the present disclosure, it is possible to efficiently generate a learning model having a high accuracy. Note that it is possible to efficiently generate a learning model having a high accuracy also by using an image processing method executed by the image processing apparatus 1 and a program for executing the image processing method.

First Example Embodiment

The example embodiment will be described hereinafter with reference to the drawings. For the clarification of the description, the following descriptions and the drawings are partially omitted or simplified as appropriate. Further, the same elements are denoted by the same reference numerals or symbols throughout the drawings, and redundant descriptions are omitted as necessary.

Figure 2:
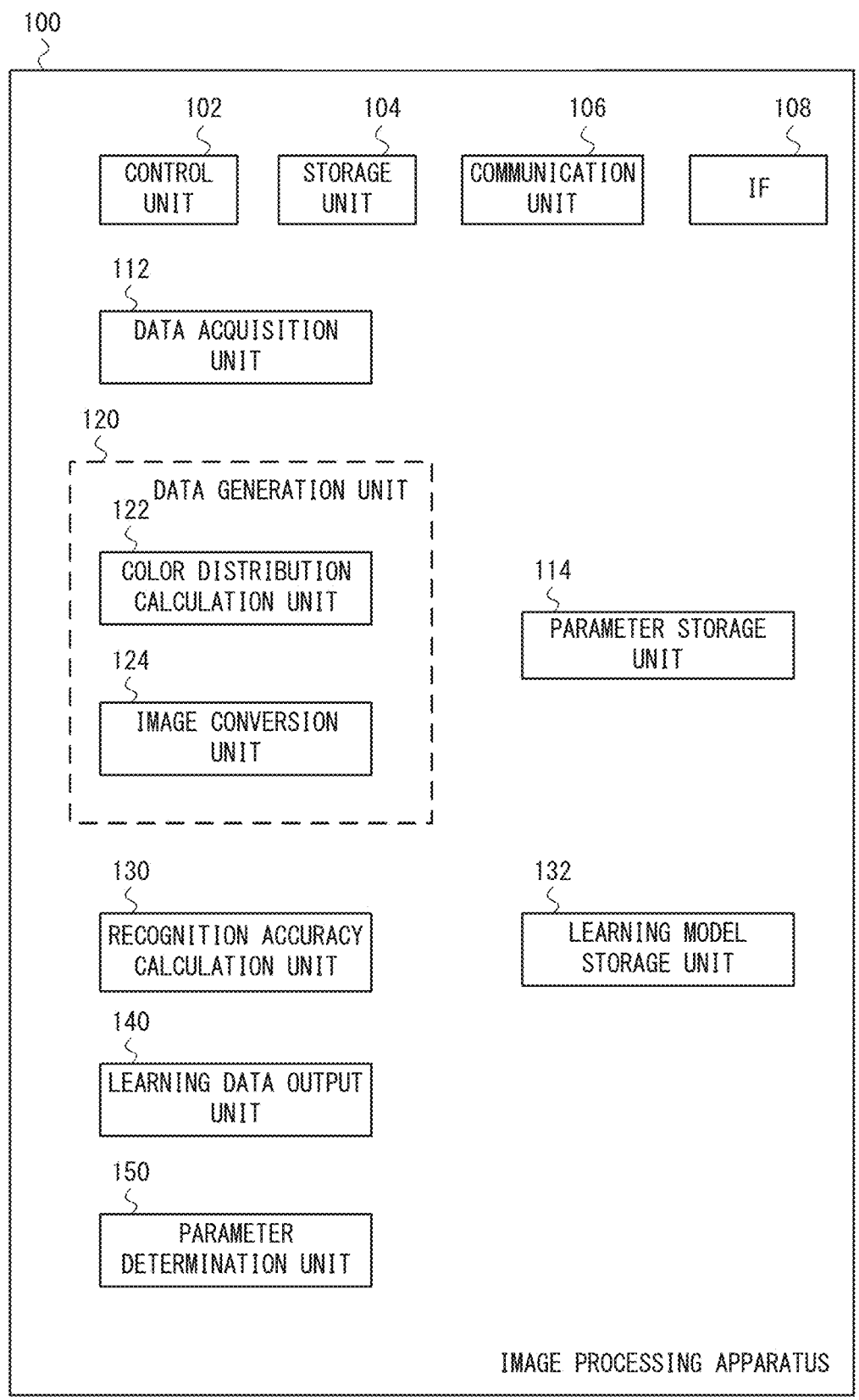
FIG. 2 is a diagram showing a configuration of an image processing apparatus according to a first example embodiment.

FIG. 2 is a diagram showing a configuration of an image processing apparatus 100 according to a first example embodiment. The image processing apparatus 100 corresponds to the image processing apparatus 1 shown in FIG. 1. The image processing apparatus 100 is, for example, a computer such as a server. The image processing apparatus 100 processes the captured input image and outputs learning data (training data) used for generation (machine learning) of a learning model used for image recognition.

The image processing apparatus 100 includes, as a main hardware configuration, a control unit 102, a storage unit 104, a communication unit 106, and an interface unit 108 (IF; Interface). The control unit 102, the storage unit 104, the communication unit 106, and the interface unit 108 are connected to each other via a data bus or the like.

The control unit 102 is, for example, a processor such as a Central Processing Unit (CPU). The control unit 102 functions as an arithmetic device executing control processing, arithmetic processing, and the like. The storage unit 104 is, for example, a storage device such as a memory or a hard disk. The storage unit 104 is, for example, a Read Only Memory (ROM) or a Random Access Memory (RAM). The storage unit 104 has a function of storing a control program, an arithmetic program, and the like executed by the control unit 102. Further, the storage unit 104 has a function of temporarily storing processing data and the like. The storage unit 104 may include a database.

The communication unit 106 performs processing required to communicate with other apparatuses via a network. The communication unit 106 may include a communication port, a router, a firewall, and the like. The interface unit 108 (IF; Interface) is, for example, a user interface (UI). The interface unit 108 includes an input device such as a keyboard, a touch panel, or a mouse, and an output device such as a display or a speaker. The interface unit 108 receives a data input operation performed by a user (an operator) and outputs information to the user. The interface unit 108 may display, for example, an input image, a target image, an index image, and a converted image data, which images and data will be described later.

The image processing apparatus 100 according to the first example embodiment includes a data acquisition unit 112, a parameter storage unit 114, a data generation unit 120, a recognition accuracy calculation unit 130, a learning model storage unit 132, a learning data output unit 140, and a parameter determination unit 150. Further, the data generation unit 120 includes a color distribution calculation unit 122 and an image conversion unit 124.

The data acquisition unit 112 functions as data acquisition means. The parameter storage unit 114 functions as parameter storage means. The data generation unit 120 functions as data generation means. The recognition accuracy calculation unit 130 functions as recognition accuracy calculation means. The learning model storage unit 132 functions as learning model storage means. The learning data output unit 140 functions as learning data output means. The parameter determination unit 150 functions as parameter determination means. The color distribution calculation unit 122 functions as color distribution calculation means. The image conversion unit 124 functions as image conversion means. Note that specific functions of the respective components will be described later.

Note that each component can be implemented, for example, by executing a program under the control of the control unit 102. More specifically, each component can be implemented by the control unit 102 executing a program stored in the storage unit 104. Further, each component may be implemented by installing a necessary program stored in any nonvolatile recording medium as required. Further, each component is not necessarily implemented by software executed by a program, and may instead be implemented, for example, by any combination of hardware, firmware, and software. Further, each component may also be implemented using a user-programmable integrated circuit, such as a field-programmable gate array (FPGA) or a microcomputer. In this case, a program composed of each of the aforementioned components may be implemented by using this integrated circuit. The aforementioned matters also apply to example embodiments other than the first example embodiment, which other example embodiments will be described later.

The data acquisition unit 112 corresponds to the data acquisition unit 2 shown in FIG. 1. The parameter storage unit 114 stores in advance a plurality of data conversion parameters used for image conversion described later. Data stored in the parameter storage unit 114 will be described later. Here, the data conversion parameter may include a color distribution. Further, the color distribution is, for example, an average and a standard deviation (or variance) of the luminance of an image. However, the color distribution is not limited thereto.

The data generation unit 120 corresponds to the data generation unit 4 shown in FIG. 1. The color distribution calculation unit 122 calculates a color distribution of input image data. The image conversion unit 124 converts input image data based on the color distribution of the input image data and a data conversion parameter (a color distribution). By the above configuration, the data generation unit 120 newly generates image data that is a candidate for learning data. The learning model storage unit 132 stores in advance a learning model used to calculate a recognition accuracy. The recognition accuracy calculation unit 130 corresponds to the recognition accuracy calculation unit 6 shown in FIG. 1. The learning data output unit 140 corresponds to the learning data output unit 8 shown in FIG. 1.

The parameter determination unit 150 determines a new data conversion parameter used to convert input image data by using the data conversion parameter that has been used for the conversion performed when learning data (image data) output by the learning data output unit 140 is generated. Specifically, the parameter determination unit 150 determines a new color distribution by using the color distribution that has been used for the conversion related to the learning data. The data generation unit 120 converts the input image data by using the data conversion parameter (the color distribution) determined by the parameter determination unit 150. In this way, the image processing apparatus 100 according to the first example embodiment can efficiently generate learning data.

Here, the data generation unit 120 according to the first example embodiment converts, based on data conversion parameters (color distributions) for a plurality of respective areas of input image data, the input image data for each of the plurality of areas thereof. The parameter determination unit 150 determines a new data conversion parameter (a color distribution) for each of the plurality of areas by using the data conversion parameter (the color distribution) that has been used for the conversion related to the learning data. In this way, the image processing apparatus 100 according to the first example embodiment can efficiently generate learning data of a large number of patterns.

Figure 3:
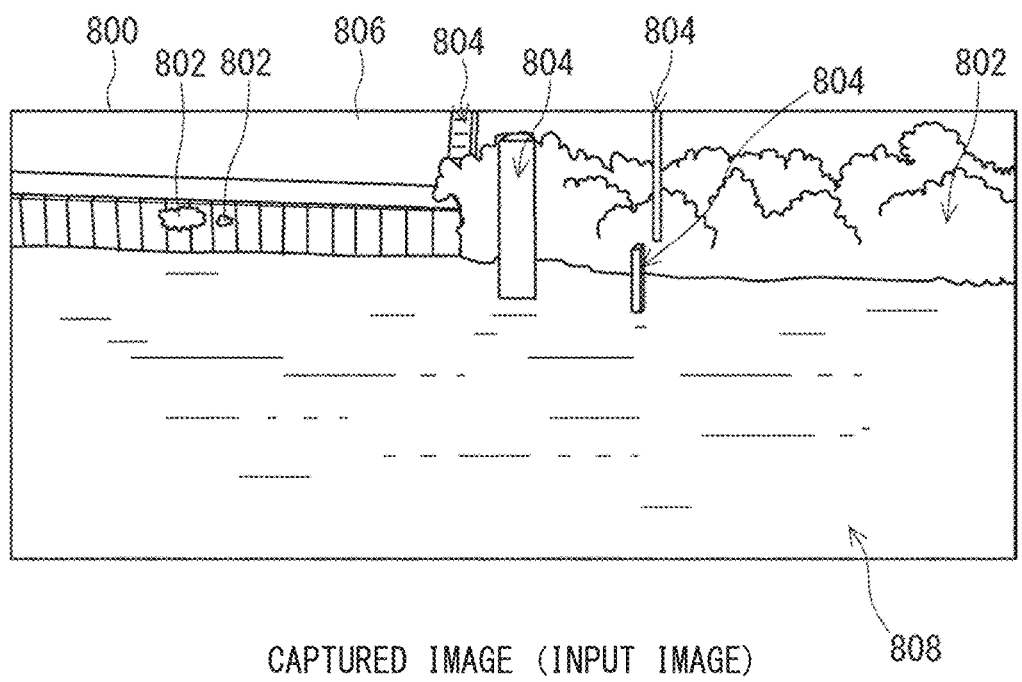
FIG. 3 is a diagram illustrating an input image that is a captured image.

FIG. 3 is a diagram illustrating an input image 800 that is a captured image. The input image 800 illustrated in FIG. 3 is an image of a riverside in the morning. The input image 800 includes a grass area 802 corresponding to an image of grass, a pole area 804 corresponding to an image of a pole, an asphalt area 806 corresponding to an image of asphalt (i.e., asphalt pavement), and a river area 808 corresponding to an image of a river. Note that a method of dividing the areas is not limited to the above, and is appropriately determined in accordance with an input image. For example, when an input image is an image of a vehicle traveling on a road, the input image may be divided into areas such as a vehicle area, a roadway area, a sidewalk area, a sign area, a building area, and a pedestrian area.

Figure 4:
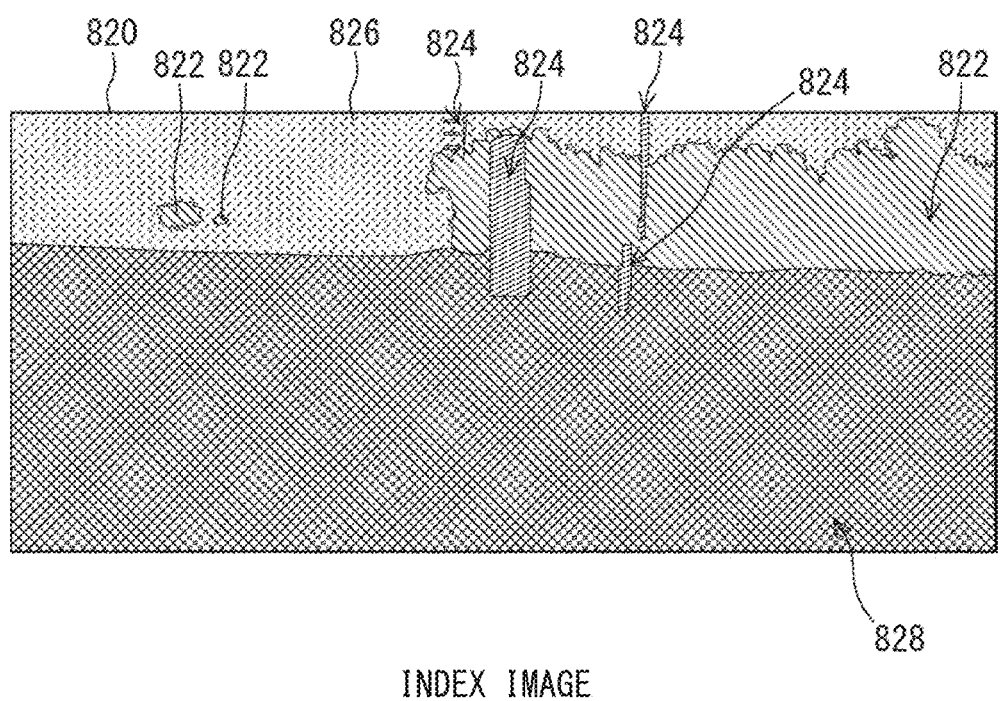
FIG. 4 is a diagram illustrating an index image corresponding to the input image shown in FIG. 3.

FIG. 4 is a diagram illustrating an index image 820 corresponding to the input image 800 shown in FIG. 3. The index image 820 may be generated, for example, by hand using the input image 800. The index image 820 shows what each area of the input image 800 indicates. Further, the index image 820 labels what each area of the input image 800 indicates for each pixel. In the index image 820, a label (e.g., "1") indicating "grass" is assigned to each pixel in an area 822. Further, a label (e.g., "2") indicating a "pole" is assigned to each pixel of an area 824. Further, a label (e.g., "3") indicating "asphalt" is assigned to each pixel of an area 826. Further, a label (e.g., "4") indicating a "river" is assigned to each pixel of an area 828. By using the input image 800 and the index image 820, the color distribution calculation unit 122 can calculate a color distribution of each area of the input image 800. Further, the image conversion unit 124 can perform image conversion for each area of the input image 800.

Figure 5:
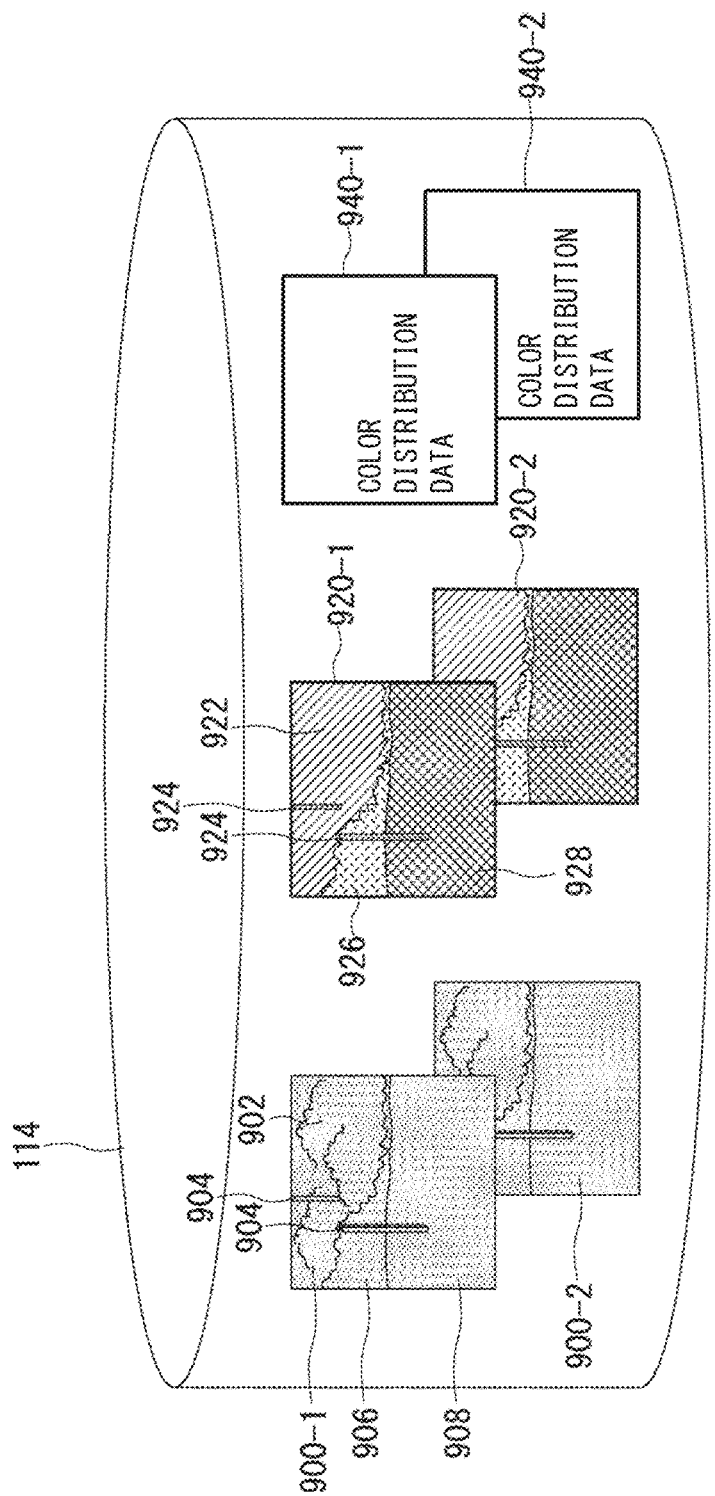
FIG. 5 is a diagram illustrating data stored in a parameter storage unit according to the first example embodiment.

FIG. 5 is a diagram illustrating data stored in the parameter storage unit 114 according to the first example embodiment. The parameter storage unit 114 stores target image data 900-1 and target image data 900-2, index image data 920-1 and index image data 920-2, and color distribution data 940-1 and color distribution data 940-2. The index image data 920-1 and the color distribution data 940-1 correspond to the target image data 900-1. The index image data 920-2 and the color distribution data 940-2 correspond to the target image data 900-2. Note that, in the following description, when a plurality of components, such as the target image data 900-1 and the target image data 900-2, are described without being distinguished from each other, they may be simply referred to as target image data 900.

The target image data 900 is an image captured and labeled in advance. The target image data 900-1 and the target image data 900-2 are images of a riverside at night. Note that the riverside in the target image data 900 may be different from the riverside in the input image 800. That is, the subject of the target image data 900 may be different from the subject of the input image 800. The target image data 900 includes a grass area 902 corresponding to an image of grass, a pole area 904 corresponding to an image of a pole, an asphalt area 906 corresponding to an image of asphalt (i.e., asphalt pavement), and a river area 908 corresponding to an image of a river.

The index image data 920 may be generated, for example, by hand using the target image data 900. The index image data 920 shows what each area of the target image data 900 indicates. Further, the index image data 920 labels what each area of the target image data 900 indicates for each pixel. In the index image data 920, a label (e.g., "1") indicating "grass" is assigned to each pixel in an area 922. Further, a label (e.g., "2") indicating a "pole" is assigned to each pixel of an area 924. Further, a label (e.g., "3") indicating "asphalt" is assigned to each pixel of an area 926. Further, a label (e.g., "4") indicating a "river" is assigned to each pixel of an area 928.

The color distribution data 940 shows a color distribution of each area of the target image data 900. That is, the color distribution data 940 may include color distribution data of pixels corresponding to the area 922, color distribution data of pixels corresponding to the area 924, color distribution data of pixels corresponding to the area 926, and color distribution data of pixels corresponding to the area 928. Note that the color distribution data 940 may include color distribution data of the entire image.

Figure 6:
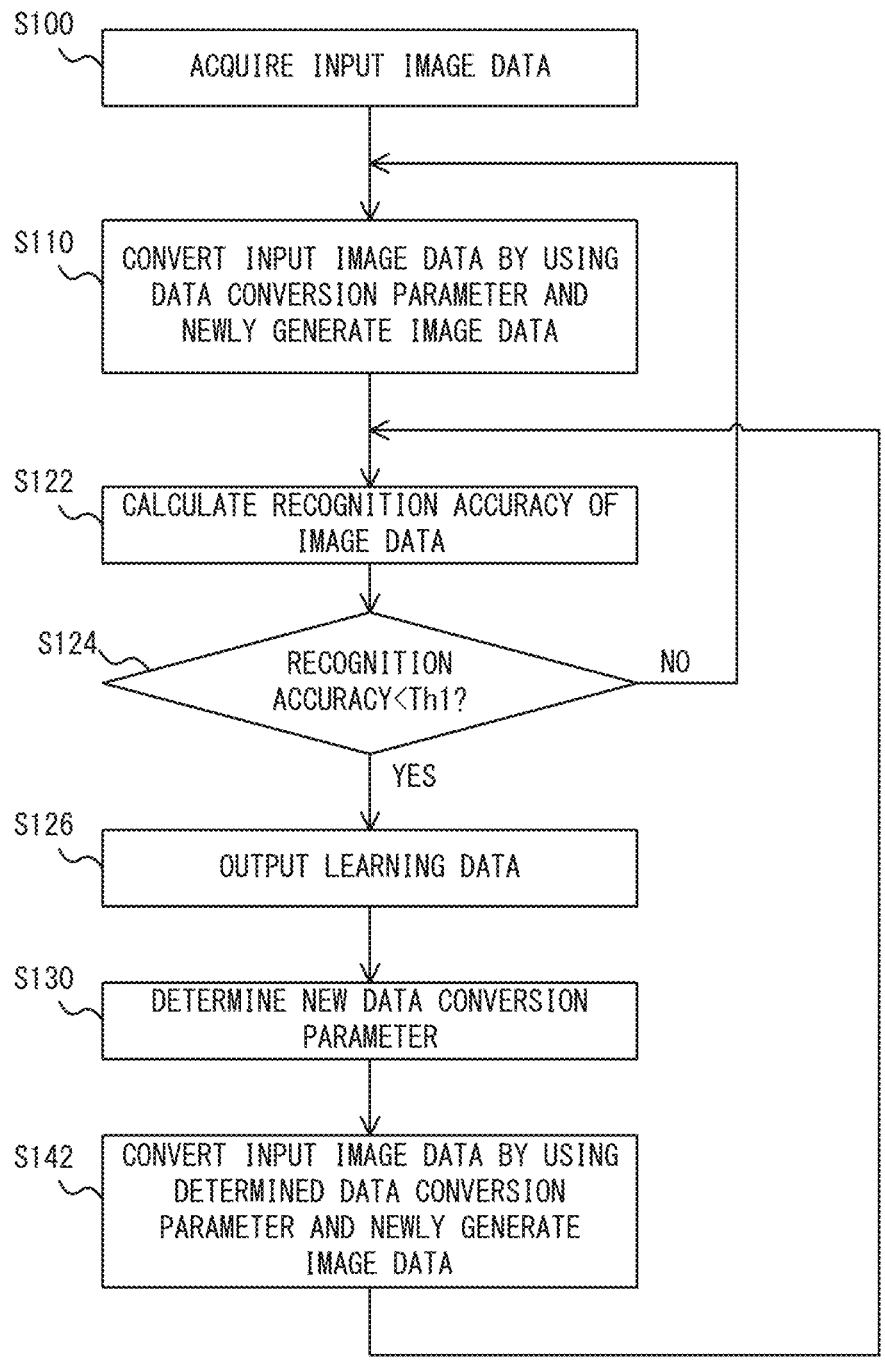
FIG. 6 is a flowchart showing an image processing method executed by the image processing apparatus according to the first example embodiment.

FIG. 6 is a flowchart showing an image processing method executed by the image processing apparatus 100 according to the first example embodiment. The data acquisition unit 112 acquires input image data (Step S100). Specifically, for example, a user inputs input image data indicating the input image 800 as illustrated in FIG. 3 by using the interface unit 108. In this way, the data acquisition unit 112 acquires the input image data. At this time, the data acquisition unit 112 may also acquire index image data indicating the index image 820 corresponding to the input image data.

The data generation unit 120 converts the input image data by using a data conversion parameter stored in the parameter storage unit 114 and newly generates image data that is a candidate for learning data (Step S110). Here, the input image data is converted by using, for example, a technique of Color Transfer so that the color shade of the input image data becomes similar to the color shade of the target image data.

Specifically, the color distribution calculation unit 122 calculates a color distribution (an average and a standard deviation of the luminance) of the input image data by the following method. Further, the image conversion unit 124 converts the input image data based on the color distribution of the input image data and the data conversion parameter (the color distribution). Note that the data conversion parameter used in S110 may be appropriately selected in accordance with an environment of learning data to be generated. For example, when learning data is generated under the environment of "sunny night", the color distribution related to the target image data 900 that has been captured under the environment of "sunny night" and has been stored in the parameter storage unit 114 may be selected. Note that when there are a plurality of target image data 900 captured under the specified environment, the data generation unit 120 may randomly select a data conversion parameter to be used for a data conversion from the parameter storage unit 114.

A method for calculating a color distribution and a method for converting an image will be described below. First, the color distribution calculation unit 122 converts a color space of the input image data (source) from an RGB color space (255, 255, 255) to an LAB (L*a*b*) color space. The color distribution calculation unit 122 recognizes to which area (the grass area 802, the pole area 804, the asphalt area 806, or the river area 808) each pixel of the input image data belongs by using index image data. Then the color distribution calculation unit 122 calculates an average value s_mean of pixel values of each channel (L, A, B) for each area. Further, the color distribution calculation unit 122 calculates a standard deviation s_std of the pixel values of each channel (L, A, B) for each area.

Similarly, the color distribution can be calculated for the target image data 900. Note that, for the target image data 900, the color distribution data 940 may be calculated in advance before the timing at which the input image data is converted, and stored in the parameter storage unit 114. Further, the color distribution of the target image data 900 may be calculated by an arithmetic device (not shown) other than the image processing apparatus 100. The arithmetic device converts a color space of the target image data 900 (target) from the RGB color space (255, 255, 255) to the LAB (L*a*b*) color space. The arithmetic device recognizes to which area each pixel of the input image data belongs by using the index image data. Then the arithmetic device calculates an average value t_mean of the pixel values of each channel (L, A, B) for each area. Further, the arithmetic device calculates a standard deviation t_std of the pixel values of each channel (L, A, B) for each area.

The image conversion unit 124 determines which area of the input image data is to be converted in conversion processing. Note that the image conversion unit 124 may determine whether or not conversion is performed for each area. For example, the image conversion unit 124 may determine to convert the river area 808 of the input image 800, determine to convert the grass area 802 and the river area 808 of the input image 800, or determine to convert the entire area of the input image 800.

Further, the image conversion unit 124 normalizes a pixel value "source" of each channel of each pixel of the area to be converted by the following Expression 1.

$$s\_normed = (source - s\_mean)/s\_std \quad \text{(Expression 1)}$$

Then, the image conversion unit 124 converts the pixel value of each channel of each pixel of the area to be converted by the following Expression 2. In this way, the input image data is converted and new image data is generated. Note that, in Expression 2, source' is the pixel value after the conversion is performed. Further, t_mean and t_std, respectively, are the average value and the standard deviation of each channel for the area corresponding to the area to be converted in the target image data 900. For example, when the river area 808 of the input image 800 is converted, t_mean and t_std, respectively, are the average value and the standard deviation corresponding to each channel of the pixels in the river area 908 of the target image data 900.

$$source' = s\_normed * t\_std + t\_mean \quad \text{(Expression 2)}$$

Note that, as described above, the image conversion unit 124 can freely determine an area to be converted in the input image data. Therefore, for example, when the number of areas is N and the number of patterns of the target image data 900 to be applied is M, $(2^N-1)*M$ pieces of image data may be generated from one input image data. As described above, by performing a conversion for each area, it is possible to efficiently generate a large amount of learning data.

The recognition accuracy calculation unit 130 calculates a recognition accuracy of the image data by using a learning model stored in the learning model storage unit 132 (Step S122). Specifically, the recognition accuracy calculation unit 130 calculates the recognition accuracy obtained by inputting the image data generated in the process of S110 to the learning model. Here, when a method of image recognition is image classification or image detection, the recognition accuracy may be a degree of reliability (a degree of certainty or the like) of a recognized object. Further, when the image data includes a plurality of objects, the recognition accuracy may be an average value of the degrees of reliability of the respective objects, or may be a correct answer rate (the number of objects correctly recognized/the number of objects included in the image). Further, when the method of image recognition is an area division, the recognition accuracy may be a correct answer rate (the number of pixels correctly recognized/the total number of pixels).

The learning data output unit 140 determines whether or not the recognition accuracy calculated in the process of S122 is lower than a predetermined threshold Th1 (a first threshold) (Step S124). Although the threshold Th1 is, for example, 70%, it is not limited to this value. When the recognition accuracy is equal to or greater than the threshold Th1 (NO in S124), the learning data output unit 140 does not output this image data as learning data. Then, the process may return to S110. In this case, in S110 which is executed again, the data generation unit 120 may generate image data using a data conversion parameter different from the data conversion parameter (the color distribution data) previously used.

On the other hand, when the recognition accuracy is lower than the threshold value Th1 (YES in S124), the learning data output unit 140 outputs this image data as learning data (Step S126). Then the parameter determination unit 150 determines a new data conversion parameter to be used for the conversion of the input image data by using the data conversion parameter that has been used for the conversion related to the learning data output in the process of S126 (Step S130). The data generation unit 120 converts the input image data by using the data conversion parameter determined in the process of S130 and newly generates image data that is a candidate for the learning data (Step S142). Note that the method for generating image data in S142 is substantially similar to the method in S110. Then the recognition accuracy calculation unit 130 again calculates a recognition accuracy of the newly generated image data by using the learning model stored in the learning model storage unit 132 (S122).

Specifically, the parameter determination unit 150 acquires color distribution data (first color distribution data) related to the target image data 900, which color distribution data has been used when the image data output as the learning data is generated. Then the parameter determination unit 150 determines color distribution data in the vicinity of the acquired first color distribution data as a new data conversion parameter. A specific example of a method for determining color distribution data in the vicinity of the first color distribution data will be described below.

Figure 7:
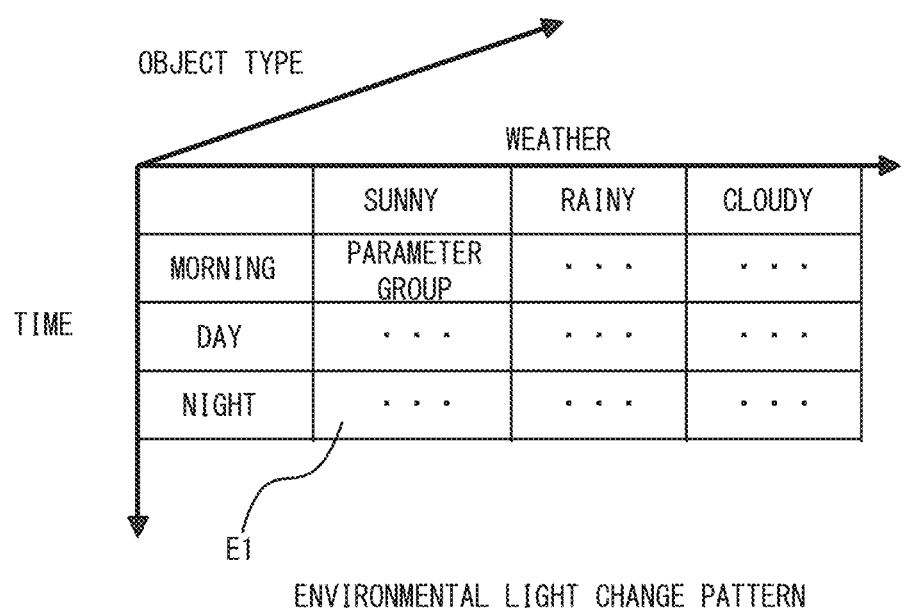
FIG. 7 is a diagram for explaining a first example of a method for determining color distribution data.

FIG. 7 is a diagram for explaining a first example of the method for determining color distribution data. FIG. 7 shows an environmental light change pattern. The environmental light change pattern may be stored, for example, in the parameter storage unit 114. The environmental light change pattern is a table composed of a time component, a weather component, and an object type component. An object type may correspond to each area of an input image or a target image. That is, in the example shown in FIGS. 3 to 5, the object types may correspond to "grass," a "pole," "asphalt," and a "river". The time component may be composed of, for example, categories of "morning", "day", and "night". The weather component may be composed of, for example, categories of "sunny", "rainy", and "cloudy". Note that the categories of the time component, the weather component, and the object type component are not limited to those described above.

The environmental light change pattern includes a parameter group composed of a plurality of data conversion parameters (color distribution data pieces) for each element (cell). The parameters in this group may correspond to the learning data pieces, respectively. For example, the data conversion parameter (the color distribution data) that has been used to convert a river area when learning data corresponding to an image of a clear night is generated is associated with an element E1 of the object type "river", the time "night", and the weather "sunny".

The parameter determination unit 150 determines an element to which the acquired first color distribution data belongs in the environmental light change pattern. The parameter determination unit 150 may determine, as color distribution data in the vicinity of the first color distribution data, another color distribution data belonging to the element to which the first color distribution data belongs. Further, the parameter determination unit 150 may determine, as color distribution data in the vicinity of the first color distribution data, color distribution data belonging to the element in the vicinity of the element to which the first color distribution data belongs. Further, the parameter determination unit 150 may determine, as color distribution data in the vicinity of the first color distribution data, color distribution data belonging to another element associated in advance with the element to which the first color distribution data belongs.

For example, it is assumed that learning data corresponding to the first color distribution data is generated by converting the river area using the color distribution data obtained from the target image data 900 corresponding to a sunny night. In this case, the first color distribution data belongs to the element E1 of the object type "river", the time "night", and the weather "sunny". Therefore, the parameter determination unit 150 may determine another color distribution data belonging to the same element E1 as a new data conversion parameter. Further, the parameter determination unit 150 may determine color distribution data belonging to an element (e.g., an element of the object type "river", the time "day", and the weather "sunny") in the vicinity of the element E1 as a new data conversion parameter. Further, the parameter determination unit 150 may determine color distribution data belonging to an element (e.g., an element of the object type "river", the time "night", the weather "cloudy") associated in advance with the element E1 as a new data conversion parameter.

Figure 8:
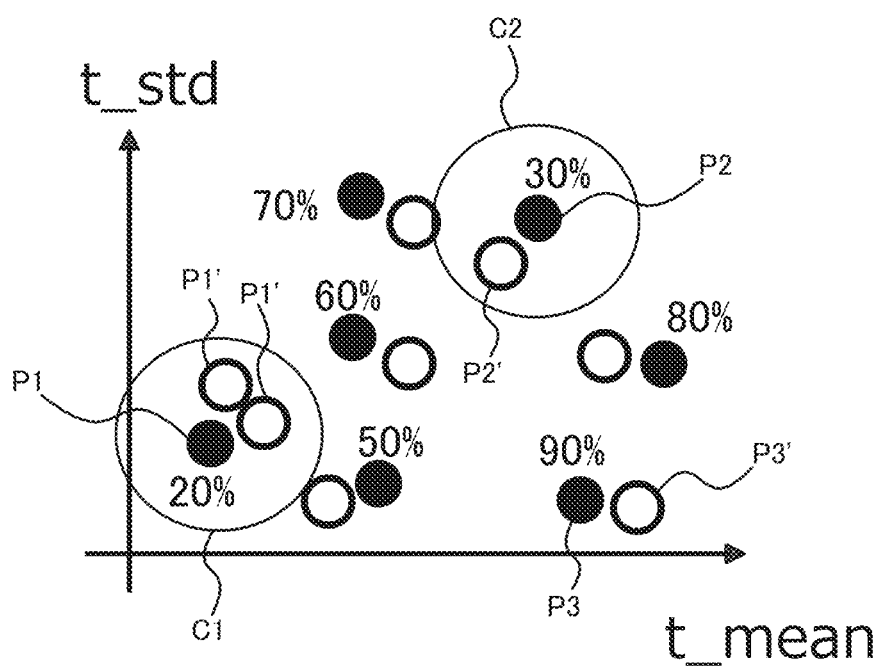
FIG. 8 is a diagram for explaining a second example of the method for determining color distribution data.

FIG. 8 is a diagram for explaining a second example of the method for determining color distribution data. FIG. 8 shows a color distribution graph in which color distribution data pieces (data conversion parameters) are plotted regarding the target image data 900 using the horizontal axis as the average value t_mean of luminance and the vertical axis as the standard deviation t_std of luminance. A number of the plotted points equal to the number of pieces of the target image data 900 may be present. Here, the points represented by black circles correspond to the color distribution data pieces that have already been used for the data conversion among the color distribution data pieces stored in the parameter storage unit 114. On the other hand, the points represented by white circles correspond to the color distribution data pieces that have not been used for the data conversion among the color distribution data pieces stored in the parameter storage unit 114. Further, in FIG. 8, in the vicinity of the point represented by the black circle, the recognition accuracy of the image data generated by performing the conversion using the color distribution data corresponding to the point is shown. For example, the recognition accuracy of the image data generated by performing the conversion using color distribution data P1 is 20%. The recognition accuracy of the image data generated by performing the conversion using color distribution data P2 is 30%. The recognition accuracy of the image data generated by performing the conversion using color distribution data P3 is 90%. Note that this color distribution graph shown in FIG. 8 may be stored in the parameter storage unit 114, and may be updated each time data conversion (data generation) and calculation of a recognition accuracy are performed.

Here, the parameter determination unit 150 may select, as color distribution data in the vicinity of the first color distribution data, color distribution data in which a difference between it and the first color distribution data is smaller than a predetermined threshold (a second threshold) in the color distribution graph. That is, the parameter determination unit 150 selects, as a new data conversion parameter, a data conversion parameter in which a difference between it and the first color distribution data is smaller than the second threshold value among a plurality of color distribution data pieces stored in the parameter storage unit 114. Here, C1 is a closed curve (e.g., a circle) indicating the second threshold for the color distribution data P1. Further, C2 is a closed curve (e.g., a circle) indicating the second threshold for the color distribution data P2. That is, the difference between the color distribution data plotted inside C1 and the color distribution data P1 is smaller than the second threshold. Similarly, the difference between the color distribution data plotted inside C2 and the color distribution data P2 is smaller than the second threshold.

Here, it is assumed that the threshold (the first threshold) of the recognition accuracy is Th1=50%. In the example shown in FIG. 8, when image data is generated by using the color distribution data P1, the recognition accuracy of this image data is lower than the first threshold. Therefore, the parameter determination unit 150 selects, as a new data conversion parameter, color distribution data P1' in which a difference between it and the color distribution data P1 is smaller (i.e., it is inside C1) than the second threshold. Similarly, when image data is generated by using the color distribution data P2, the recognition accuracy of this image data is lower than the first threshold. Therefore, the parameter determination unit 150 selects, as a new data conversion parameter, color distribution data P2' in which a difference between it and the color distribution data P2 is smaller (i.e., it is inside C2) than the second threshold. On the other hand, when image data is generated by using the color distribution data P3, the recognition accuracy of this image data is higher than the first threshold. Therefore, color distribution data P3' plotted in the vicinity of the color distribution data P3 is not selected as a new data conversion parameter.

Here, for example, a difference between color distribution data and the first color distribution data may be a distance of the color distribution data from the first color distribution data in the color distribution graph, and the second threshold may be a predetermined distance Rth2. In this case, when the first color distribution data is (t_mean1, t_std1), the parameter determination unit 150 may determine color distribution data of a set (t_mean, t_std) of values satisfying the following Expression 3 as color distribution data in the vicinity of the first color distribution data.

$$Rth2 > \sqrt{\{(t\_mean - t\_mean1)^2 + (t\_std - t\_std1)^2\}} \quad \text{(Expression 3)}$$

Further, for example, the difference between color distribution data and the first color distribution data may be defined separately for each of an average value component (the horizontal axis direction) and a standard deviation component (the vertical axis direction), and the second threshold may be separately provided for each of an average value component (the horizontal axis direction) Mth2 and a standard deviation component (the vertical axis direction) Sth2. In this case, when the first color distribution data is (t_mean1, t_std1), the parameter determination unit 150 may determine color distribution data of a set (t_mean, t_std) of values satisfying the following Expression 4 as color distribution data in the vicinity of the first color distribution data.

$$Mth2 > |t\_mean - t\_mean1| \quad \text{(Expression 4)}$$
$$Sth2 > |t\_std - t\_std1|$$

Figure 9:
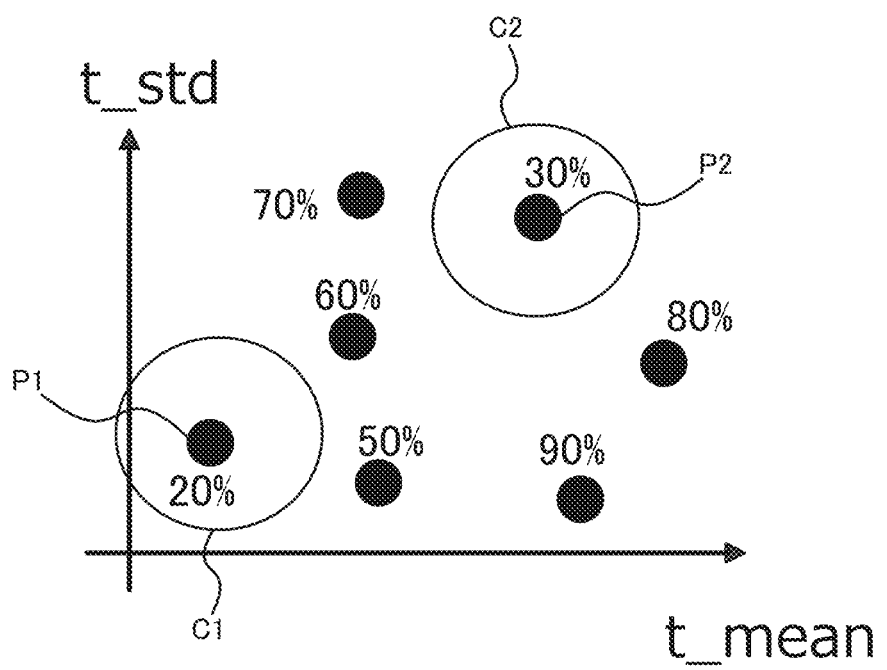
FIG. 9 is a diagram for explaining a third example of the method for determining color distribution data.

FIG. 9 is a diagram for explaining a third example of the method for determining color distribution data. FIG. 9, like FIG. 8, shows a color distribution graph in which color distribution data pieces (data conversion parameters) are plotted regarding the target image data 900 using the horizontal axis as the average value t_mean of luminance and the vertical axis as the standard deviation t_std of luminance. A number of the plotted points equal to the number of pieces of the target image data 900 may be present. Here, in the example shown in FIG. 9, the number of pieces of the target image data 900 is smaller than that in the example shown in FIG. 8. Therefore, the parameter storage unit 114 may not store unused color distribution data in the vicinity of the color distribution data (indicated by a black circle) already used for the data conversion in the color distribution graph.

In this case, the parameter determination unit 150 may generate color distribution data in which a difference between it and the first color distribution data is smaller than the predetermined threshold (the second threshold) as color distribution data in the vicinity of the first color distribution data. That is, the parameter determination unit 150 generates, as a new data conversion parameter, a data conversion parameter in which a difference between it and the first color distribution data is smaller than the second threshold. For example, the parameter determination unit 150 generates, as a new data conversion parameter, color distribution data in which a difference between it and the color distribution data P1 is smaller (i.e., it is inside C1) than the second threshold. Similarly, the parameter determination unit 150 selects, as a new data conversion parameter, color distribution data in which a difference between it and the color distribution data P2 is smaller (i.e., it is inside C2) than the second threshold.

For example, when the first color distribution data is (t_mean1, t_std1), the parameter determination unit 150 may generate color distribution data of a set (t_mean, t_std) of values satisfying the above Expression 3 as color distribution data in the vicinity of the first color distribution data. Further, for example, the parameter determination unit 150 may generate color distribution data of a set (t_mean, t_std) of values satisfying the above Expression 4 as color distribution data in the vicinity of the first color distribution data. In these cases, the parameter determination unit 150 may generate, for example, color distribution data (t_mean1+α, t_std1+β) satisfying Expression 3 or Expression 4.

By doing the above, learning data having a low recognition accuracy may be generated one after another in the current learning model. A learning model is generated by machine learning such as deep learning using this plurality of generated learning data. In this case, a learning model may be generated by updating the learning model stored in the learning model storage unit 132 by using this plurality of generated learning data. In the first example embodiment, processing for generating a learning model may be performed by an apparatus other than the image processing apparatus 100.

As described above, the image processing apparatus 100 according to the first example embodiment converts input image data by using a data conversion parameter and newly generates image data that is a candidate of learning data. Then the image processing apparatus 100 according to the first example embodiment calculates a recognition accuracy of the image data generated by using a learning model, and outputs, as the learning data, the image data of which the calculated recognition accuracy is lower than a predetermined first threshold. In this way, as described above, it is possible to efficiently improve the recognition accuracy of the learning model.

Further, as described above, the parameter determination unit 150 according to the first example embodiment is configured to determine a new data conversion parameter to be used for a conversion of the input image data by using the data conversion parameter that has been used for the conversion related to the output learning data. Here, it is highly likely that the recognition accuracy of the image data, generated by using the data conversion parameter in the vicinity of the data conversion parameter having a low recognition accuracy, is low. Therefore, it is possible to efficiently generate learning data that is highly likely to have a low recognition accuracy.

Further, as described above, the data generation unit 120 according to the first example embodiment is configured to convert input image data based on a color distribution of the input image data. Further, the parameter determination unit 150 according to the first example embodiment is configured to determine a new color distribution by using the color distribution that has been used for the conversion related to learning data. Thus, by converting an image using a color distribution, it is possible to efficiently generate new image data. Therefore, it is possible to efficiently generate learning data.

Further, as described above, the data generation unit 120 according to the first example embodiment is configured to convert, based on data conversion parameters for a plurality of respective areas of input image data, the input image data for each of the plurality of areas thereof. Further, the parameter determination unit 150 according to the first example embodiment is configured to determine a new data conversion parameter for each of the plurality of areas by using the data conversion parameter used for the conversion related to the learning data. As described above, in the first example embodiment, a conversion is performed for each area of the input image data, so that it is possible to efficiently generate a large amount of learning data.

Further, the parameter storage unit 114 according to the first example embodiment stores a plurality of data conversion parameters. Further, the parameter determination unit 150 according to the first example embodiment determines, as a new data conversion parameter, a data conversion parameter in which a difference between it and the data conversion parameter that has been used for the conversion related to the learning data is smaller than the second threshold from among the plurality of stored data conversion parameters. As described above, by selecting a new data conversion parameter from among the data conversion parameters that have already been stored, it is possible to efficiently determine a new data conversion parameter.

Further, the parameter determination unit 150 according to the first example embodiment generates, as a new data conversion parameter to be used for the conversion of the input image data, a data conversion parameter in which a difference between it and the data conversion parameter that has been used for the conversion related to the learning data is smaller than the second threshold. By doing so, it is possible to determine a new data conversion parameter even when the number of pieces of target image data stored in advance is small.

Second Example Embodiment

Next, a second example embodiment will be described with reference to the drawings. For the clarification of the description, the following descriptions and the drawings are partially omitted or simplified as appropriate. Further, the same elements are denoted by the same reference numerals or symbols throughout the drawings, and redundant descriptions are omitted as necessary.

Figure 10:
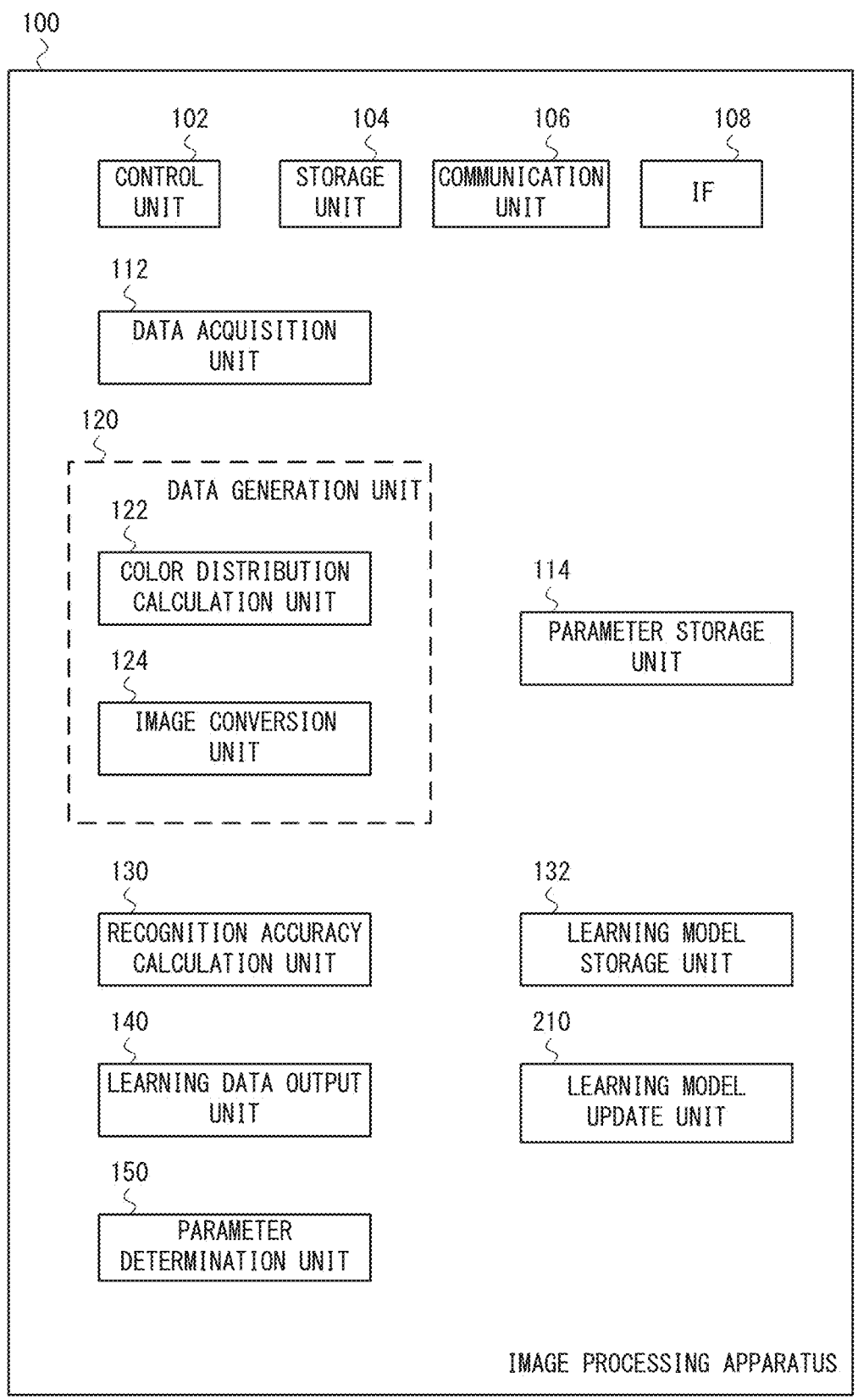
FIG. 10 is a diagram showing a configuration of an image processing apparatus according to a second example embodiment.

FIG. 10 is a diagram showing a configuration of the image processing apparatus 100 according to the second example embodiment. A hardware configuration of the image processing apparatus 100 according to the second example embodiment is substantially similar to that of the image processing apparatus 100 according to the first example embodiment, and thus the description thereof will be omitted. The image processing apparatus 100 according to the second example embodiment includes, like in the first example embodiment, the data acquisition unit 112, the parameter storage unit 114, the data generation unit 120, the recognition accuracy calculation unit 130, the learning model storage unit 132, the learning data output unit 140, and the parameter determination unit 150. Further, the data generation unit 120 includes the color distribution calculation unit 122 and the image conversion unit 124.

Further, the image processing apparatus 100 according to the second example embodiment includes a learning model update unit 210. The learning model update unit 210 functions as learning model update means. The learning model update unit 210 updates a learning model stored in the learning model storage unit 132 by using learning data output by the learning data output unit 140.

Figure 11:
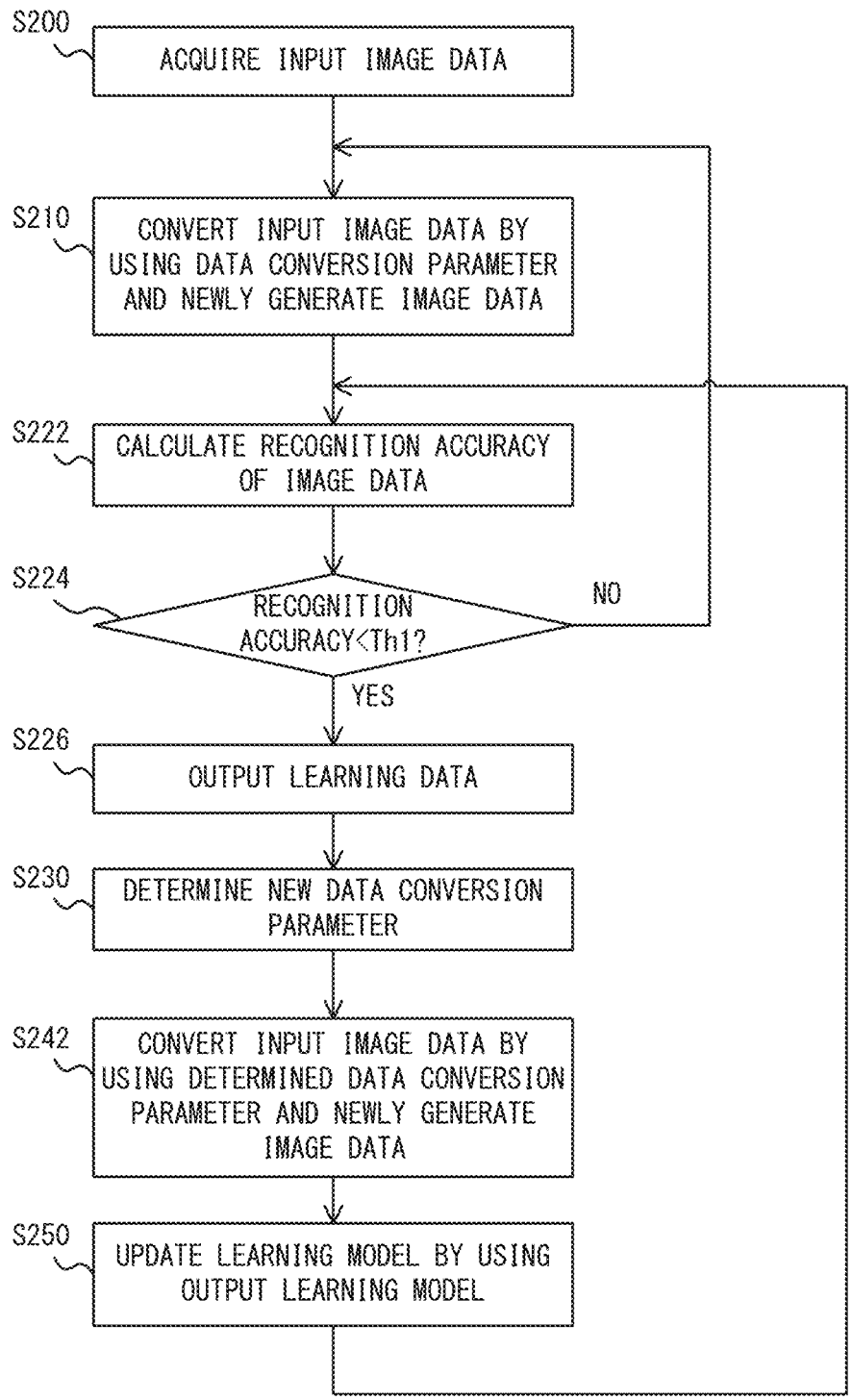
FIG. 11 is a flowchart showing an image processing method executed by the image processing apparatus according to the second example embodiment.

FIG. 11 is a flowchart showing an image processing method executed by the image processing apparatus 100 according to the second example embodiment. Like in S100 shown in FIG. 6, the data acquisition unit 112 acquires input image data (Step S200). Next, like in S110 shown in FIG. 6, the data generation unit 120 converts the input image data by using a data conversion parameter stored in the parameter storage unit 114 and newly generates image data that is a candidate for learning data (Step S210). Next, like in S122 shown in FIG. 6, the recognition accuracy calculation unit 130 calculates a recognition accuracy of the image data by using a learning model stored in the learning model storage unit 132 (Step S222).

Next, like in S124 shown in FIG. 6, the learning data output unit 140 determines whether or not the recognition accuracy calculated in the process of S122 is lower than the predetermined threshold Th1 (the first threshold) (S224). When the recognition accuracy is equal to or greater than the threshold Th1 (NO in S224), the learning data output unit 140 does not output this image data as learning data. Then, the process may return to S210. On the other hand, when the recognition accuracy is lower than the threshold value Th1 (YES in S124), the learning data output unit 140 outputs this image data as learning data like in S126 shown in FIG. 6 (S226).

Like in S130 shown in FIG. 6, the parameter determination unit 150 determines a new data conversion parameter to be used for the conversion of the input image data by using the data conversion parameter used for the conversion related to the learning data output in the process of S226 (Step S230). Then, like in S142 shown in FIG. 6, the data generation unit 120 converts the input image data by using the data conversion parameter determined in the process of S230 and newly generates image data that is a candidate for the learning data (Step S242).

The learning model update unit 210 updates a learning model by using the output learning model (Step S250). Specifically, the learning model update unit 210 updates the learning model by online learning each time the learning data is output. In this case, labeling of correct answers corresponding to the output learning data may be performed by using index image data input in the process of S200. Note that when the image processing apparatus 100 and the like can store all the learning data pieces that have been used to generate the current learning model, batch learning may be performed by using these stored learning data pieces and the learning data output in the process of S226. Further, the aforementioned update of the learning model is not necessarily performed each time one learning data is output, and may instead be performed each time a predetermined number of pieces of the learning data is output, for example, 10 pieces of the learning data are output. Then, the recognition accuracy calculation unit 130 calculates a recognition accuracy of the image data generated in the process of S242 by using the learning model updated in the process of S250 (S222).

Here, as described above, the learning data output in the process of S226 is image data having a low recognition accuracy in the learning model before updating of it. Further, in the second example embodiment, the learning model is updated each time learning data is output. That is, in the second example embodiment, since the learning model is updated by using the learning data which is the image data having a low recognition accuracy, the recognition accuracy of the learning model is improved.

In such a case, when the recognition accuracy is calculated by using the learning model updated in the process of S250, the recognition accuracy may be higher than that when the recognition accuracy is calculated by using the learning model before updating of it. Therefore, the learning data that would be output when it is assumed that the learning model before updating of it has been used is less likely to be output in the process of S226. Thus, it is possible to reduce the number of pieces of the learning data to be output, so that it is possible to reduce a load such as a time required for machine learning. Therefore, the efficiency of learning can be improved by the image processing apparatus 100 according to the second example embodiment. Further, it is possible to reduce the number of pieces of the learning data to be output, so that it is possible to reduce resources for storing the learning data. Further, since the learning data is less likely to be output in the process of S226, the process of S242 is prevented from being performed. Therefore, it is possible to prevent a load or reduce the load on the parameter determination unit 150.

Note that, in the first example embodiment, the learning model used when a plurality of learning data pieces are successively output is the same throughout the processes shown in FIG. 6. In such a case, a plurality of learning data pieces having color distributions similar to each other are output and used for machine learning. However, if learning is performed using one of these plurality of learning data pieces having color distributions similar to each other, the learning may be able to be performed so that the remaining learning data pieces can be recognized. In other words, these remaining learning data pieces may be learning data pieces unnecessary for performing machine learning. That is, this unnecessary learning data may not greatly contribute to the improvement of the recognition accuracy of the learning model. On the other hand, in the second example embodiment, it is possible to prevent the output of such unnecessary learning data. Therefore, the image processing apparatus 100 according to the second example embodiment can increase the possibility of collecting effective learning data that may contribute to the improvement of the recognition accuracy of the learning model.

For example, in a case in which the learning model is not updated as in the case of the first example embodiment, it is assumed that 100 pieces of learning data are output. In this case, in the second example embodiment, by updating the learning model using one of these 100 pieces of learning data, a learning model capable of recognizing the remaining 99 pieces of learning data may be generated. Therefore, in the second example embodiment, the output of the unnecessary 99 pieces of learning data can be prevented.

(Modified Example)

Note that the present disclosure is not limited to the above-described example embodiments and may be modified as appropriate without departing from the spirit of the present disclosure. For example, in the flowchart described above, the order of processes (steps) can be changed as appropriate. Further, one or more of a plurality of processes (steps) may be omitted. For example, in FIG. 6, the process of S126 may be executed after the process of S142 (the same applies to FIG. 11). Further, in FIG. 11, the process of S250 may be executed before the process of S230. Further, in FIG. 6, the processes of S130 and S142 may be omitted (the same applies to FIG. 11).

Further, in the above-described example embodiments, in the method for calculating a color distribution, the color distribution calculation unit 122 converts the color space of the input image data (source) from the RGB color space to the LAB color space. However, in the method for calculating a color distribution, it is not necessary to convert the color space from the RGB color space to the LAB color space. However, by converting the color space to the LAB space, processing can be performed in a way similar to the way human vision is used.

Further, in the above-described example embodiments, although a data conversion parameter is a color distribution, the data conversion parameter is not limited to the color distribution. Further, in the above-described example embodiments, although a color conversion is performed as an image conversion, the image conversion may not be the color conversion. For example, enhancement processing (sharpness), smoothing processing (smoothing), or outline extraction may instead be performed. Alternatively, for example, geometric transformation (affine transformation) for changing the size, the inclination, or the like of a specific object in the image may be performed.

Further, in the above-described example embodiments, when an image conversion is performed, the conversion is performed for each area of input image data. However, the present disclosure is not limited to such a configuration. The entire input image data may be converted. Further, the data generation unit may generate image data by converting the input image data for each of a plurality of areas thereof, and further generate image data by converting the entire input image data. By doing so, it is possible to further increase variations of the generated image data.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The whole or part of the example embodiments disclosed above can be described as, but not limited to, the following supplementary notes.

(Supplementary Note 1)
An image processing apparatus comprising:
data acquisition means for acquiring input image data;
data generation means for converting the input image data by using a data conversion parameter and newly generating image data;
recognition accuracy calculation means for calculating a recognition accuracy of the image data generated by the data generation means by using a learning model stored in advance; and
learning data output means for outputting, as learning data, the image data of which the recognition accuracy calculated by the recognition accuracy calculation means is lower than a predetermined first threshold.

(Supplementary Note 2)
The image processing apparatus according to Supplementary note 1, further comprising parameter determination means for determining a new data conversion parameter to be used for a conversion of the input image data by using the data conversion parameter that has been used for the conversion related to the learning data output by the learning data output means,
wherein the data generation means further converts the input image data by using the data conversion parameter determined by the parameter determination means.

(Supplementary Note 3)
The image processing apparatus according to Supplementary note 2, wherein
the data generation means converts the input image data based on a color distribution of the input image data, and
the parameter determination means determines a new color distribution by using the color distribution that has been used for the conversion related to the learning data.

(Supplementary Note 4)
The image processing apparatus according to Supplementary note 2 or 3, wherein
the data generation means converts, based on the data conversion parameter for each of a plurality of areas of the input image data, the input image data for each of the plurality of areas thereof, and
the parameter determination means determines a new data conversion parameter for each of the plurality of areas by using the data conversion parameter that has been used for the conversion related to the learning data.

(Supplementary Note 5)
The image processing apparatus according to any one of Supplementary notes 2 to 4, further comprising parameter storage means for storing a plurality of the data conversion parameters in advance,
wherein the parameter determination means selects, as a new data conversion parameter to be used for a conversion of the input image data, a data conversion parameter in which a difference between it and the data conversion parameter that has been used for the conversion related to the learning data is smaller than a predetermined second threshold from among the plurality of the data conversion parameters stored in the parameter storage means.

(Supplementary Note 6)
The image processing apparatus according to any one of Supplementary notes 2 to 4, wherein the parameter determination means generates, as a new data conversion parameter to be used for a conversion of the input image data, a data conversion parameter in which a difference between it and the data conversion parameter that has been used for the conversion related to the learning data is smaller than the predetermined second threshold.

(Supplementary Note 7)
The image processing apparatus according to any one of Supplementary notes 1 to 6, further comprising learning model update means for updating the learning model by using the learning data output by the learning data output means,
wherein the recognition accuracy calculation means calculates, by using the learning model updated by the learning model update means, a recognition accuracy of the image data obtained by the conversion performed by the data generation means.

(Supplementary Note 8)
An image processing method comprising:
acquiring input image data;
converting the input image data by using a data conversion parameter and newly generating image data;
calculating a recognition accuracy of the generated image data by using a learning model stored in advance; and
outputting, as learning data, the image data of which the calculated recognition accuracy is lower than a predetermined first threshold.

(Supplementary Note 9)
The image processing method according to Supplementary note 8, further comprising:
determining a new data conversion parameter to be used for a conversion of the input image data by using the data conversion parameter that has been used for the conversion related to the learning data to be output; and further converting the input image data by using the determined data conversion parameter.

(Supplementary Note 10)

The image processing method according to Supplementary note 9, further comprising:
converting the input image data based on a color distribution of the input image data; and
determining a new color distribution by using the color distribution that has been used for the conversion related to the learning data.

(Supplementary Note 11)

The image processing method according to Supplementary note 9 or 10, further comprising:
converting, based on the data conversion parameter for each of a plurality of areas of the input image data, the input image data for each of the plurality of areas thereof; and
determining a new data conversion parameter for each of the plurality of areas by using the data conversion parameter that has been used for the conversion related to the learning data.

(Supplementary Note 12)

The image processing method according to any one of Supplementary notes 9 to 11, further comprising selecting, as a new data conversion parameter to be used for a conversion of the input image data, a data conversion parameter in which a difference between it and the data conversion parameter that has been used for the conversion related to the learning data is smaller than a predetermined second threshold from among a plurality of the data conversion parameters stored in advance.

(Supplementary Note 13)

The image processing method according to any one of Supplementary notes 9 to 11, further comprising generating, as a new data conversion parameter to be used for a conversion of the input image data, a data conversion parameter in which a difference between it and the data conversion parameter that has been used for the conversion related to the learning data is smaller than the predetermined second threshold.

(Supplementary Note 14)

The image processing method according to any one of Supplementary notes 8 to 13, further comprising:
updating the learning model by using the learning data to be output; and
calculating, by using the updated learning model, a recognition accuracy of the image data obtained by the conversion.

(Supplementary Note 15)

A non-transitory computer readable medium storing a program for causing a computer to:
acquire input image data;
convert the input image data by using a data conversion parameter and newly generate image data;
calculate a recognition accuracy of the generated image data by using a learning model stored in advance; and
output, as learning data, the image data of which the calculated recognition accuracy is lower than a predetermined first threshold.

Although the present disclosure has been described with reference to the example embodiments, the present disclosure is not limited to the above-described example embodiments. Various modifications that may be understood by those skilled in the art may be made to the configurations and details of the present disclosure within the scope of the disclosure.

This application is based upon and claims the benefit of priority from Japanese patent application No. 2019-061866, filed on Mar. 27, 2019, the disclosure of which is incorporated herein in its entirety by reference.

REFERENCE SIGNS LIST

1 IMAGE PROCESSING APPARATUS
2 DATA ACQUISITION UNIT
4 DATA GENERATION UNIT
6 RECOGNITION ACCURACY CALCULATION UNIT
8 LEARNING DATA OUTPUT UNIT
100 IMAGE PROCESSING APPARATUS
112 DATA ACQUISITION UNIT
114 PARAMETER STORAGE UNIT
120 DATA GENERATION UNIT
122 COLOR DISTRIBUTION CALCULATION UNIT
124 IMAGE CONVERSION UNIT
130 RECOGNITION ACCURACY CALCULATION UNIT
132 LEARNING MODEL STORAGE UNIT
140 LEARNING DATA OUTPUT UNIT
150 PARAMETER DETERMINATION UNIT
210 LEARNING MODEL UPDATE UNIT

The invention claimed is:

1. An image processing apparatus comprising:
at least one memory storing instructions; and
at least one processor configured to execute the instructions to:
acquire an input image;
convert, based on a first color distribution of the input image, the input image to a first converted image;
calculate, by using a learning model, a recognition accuracy of the first converted image;
determine a second color distribution, by using the first color distribution of the first converted image of which the recognition accuracy is lower than a predetermined first threshold; and
convert, by using the second color distribution, the input image to a second converted image.

2. The image processing apparatus according to claim 1, wherein the at least one processor is further configured to execute the instructions to:
convert, based on the first color distribution for each of a plurality of areas of the input image, the input image for each of the plurality of areas thereof, and
determine a second color distribution for each of the plurality of areas by using the first color distribution that has been used for conversion related to learning data.

3. The image processing apparatus according to claim 1, wherein the at least one memory is configured to store a plurality of the color distribution in advance, and
wherein the at least one processor is further configured to execute the instructions to:
select, as a second color distribution to be used for a conversion of the input image, a color distribution in which a difference between it and the first color distribution that has been used for conversion related to learning data is smaller than a predetermined second threshold from among the plurality of the color distribution stored in advance.

4. The image processing apparatus according to claim 1, wherein the at least one processor is further configured to execute the instructions to:
  generate, as a second color distribution to be used for a conversion of the input image, a color distribution in which a difference between it and the first color distribution that has been used for conversion related to learning data is smaller than the predetermined second threshold.

5. The image processing apparatus according to claim 1, wherein the at least one processor is further configured to execute the instructions to:
  update the learning model by using output learning data, and
  calculate, by using the updated learning model, a recognition accuracy of the converted image.

6. An image processing method performed by a computer and comprising:
  acquiring an input image;
  converting, based on a first color distribution of the input image, the input image to a first converted image;
  calculating, by using a learning model, a recognition accuracy of the first converted image;
  determining a second color distribution, by using the first color distribution of the first converted image of which the recognition accuracy is lower than a predetermined first threshold; and
  converting, by using the second color distribution, the input image to a second converted image.

7. The image processing method according to claim 6, further comprising:
  converting, based on the first color distribution for each of a plurality of areas of the input image, the input image for each of the plurality of areas thereof, and
  determining a second color distribution for each of the plurality of areas by using the first color distribution that has been used for conversion related to learning data.

8. The image processing method according to claim 6, further comprising:
  storing a plurality of the color distribution in advance, and
  selecting, as a second color distribution to be used for a conversion of the input image, a color distribution in which a difference between it and the first color distribution that has been used for conversion related to learning data is smaller than a predetermined second threshold from among the plurality of the color distribution stored in advance.

9. The image processing method according to claim 6, further comprising:
  generating, as a second color distribution to be used for a conversion of the input image, a color distribution in which a difference between it and the first color distribution that has been used for conversion related to learning data is smaller than the predetermined second threshold.

10. The image processing method according to claim 6, further comprising:
  updating the learning model by using output learning data, and
  calculating, by using the updated learning model, a recognition accuracy of the converted image.

11. A non-transitory computer readable medium storing a program executable by a computer to:
  acquire an input image;
  convert, based on a first color distribution of the input image, the input image to a first converted image;
  calculate, by using a learning model, a recognition accuracy of the first converted image;
  determine a second color distribution, by using the first color distribution of the first converted image of which the recognition accuracy is lower than a predetermined first threshold; and
  convert, by using the second color distribution, the input image to a second converted image.

12. The non-transitory computer readable medium according to claim 11, wherein the program is executable by the computer to further:
  convert, based on the first color distribution for each of a plurality of areas of the input image, the input image for each of the plurality of areas thereof, and
  determine a second color distribution for each of the plurality of areas by using the first color distribution that has been used for conversion related to learning data.

13. The non-transitory computer readable medium according to claim 11, wherein at least one memory is configured to store a plurality of the color distribution in advance, and the program is executable by the computer to further:
  select, as a second color distribution to be used for a conversion of the input image, a color distribution in which a difference between it and the first color distribution that has been used for conversion related to learning data is smaller than a predetermined second threshold from among the plurality of the color distribution stored in advance.

14. The non-transitory computer readable medium according to claim 11, wherein the program further causes is executable by the computer to further:
  generate, as a second color distribution to be used for a conversion of the input image, a color distribution in which a difference between it and the first color distribution that has been used for conversion related to learning data is smaller than the predetermined second threshold.

15. The non-transitory computer readable medium according to claim 11, wherein the program is executable by the computer to further:
  update the learning model by using output learning data, and
  calculate, by using the updated learning model, a recognition accuracy of the converted image.

* * * * *